United States Patent [19]

Leiber

[11] 4,197,710
[45] Apr. 15, 1980

[54] HYDRAULIC BRAKE BOOSTER

[75] Inventor: Heinz Leiber, Leimen, Fed. Rep. of Germany

[73] Assignee: Robert Bosch GmbH, Stuttgart, Fed. Rep. of Germany

[21] Appl. No.: 948,264

[22] Filed: Oct. 3, 1978

[30] Foreign Application Priority Data

Nov. 11, 1977 [DE] Fed. Rep. of Germany ....... 2750491

[51] Int. Cl.$^2$ .............................................. B60T 13/00
[52] U.S. Cl. .................................. 60/547 A; 60/581;
60/582; 60/585
[58] Field of Search ................. 60/403, 418, 545, 546, 60/550, 581, 585, 534, 547, 547 A, 582

[56] References Cited

U.S. PATENT DOCUMENTS

| | | | |
|---|---|---|---|
| 3,978,667 | 9/1976 | Ohara | 60/547 X |
| 4,034,566 | 7/1977 | Suketomo | 60/582 X |

Primary Examiner—Edgar W. Geoghegan
Attorney, Agent, or Firm—Edwin E. Greigg

[57] ABSTRACT

The invention relates to a hydraulic brake booster for a vehicle brake apparatus which is provided with a pressurizing apparatus which has a pump and a reservoir (accumulator). When the reservoir pressure fails, a switchover piston which is subject to the reservoir pressure can disengage a stop for the push rod of the control valve.

The push rod is supported on the stop when the pressure supply to the reservoir is intact and after the control valve switches over in the direction of brake activation.

In this manner, a stop for the brake pedal, which activates the push rod is formed which is subject solely to the resiliency of a travel-limiting spring. The stop operates when reservoir pressure is available to effect a longer pedal stroke. When the reservoir pressure fails, it is automatically disengaged.

13 Claims, 3 Drawing Figures

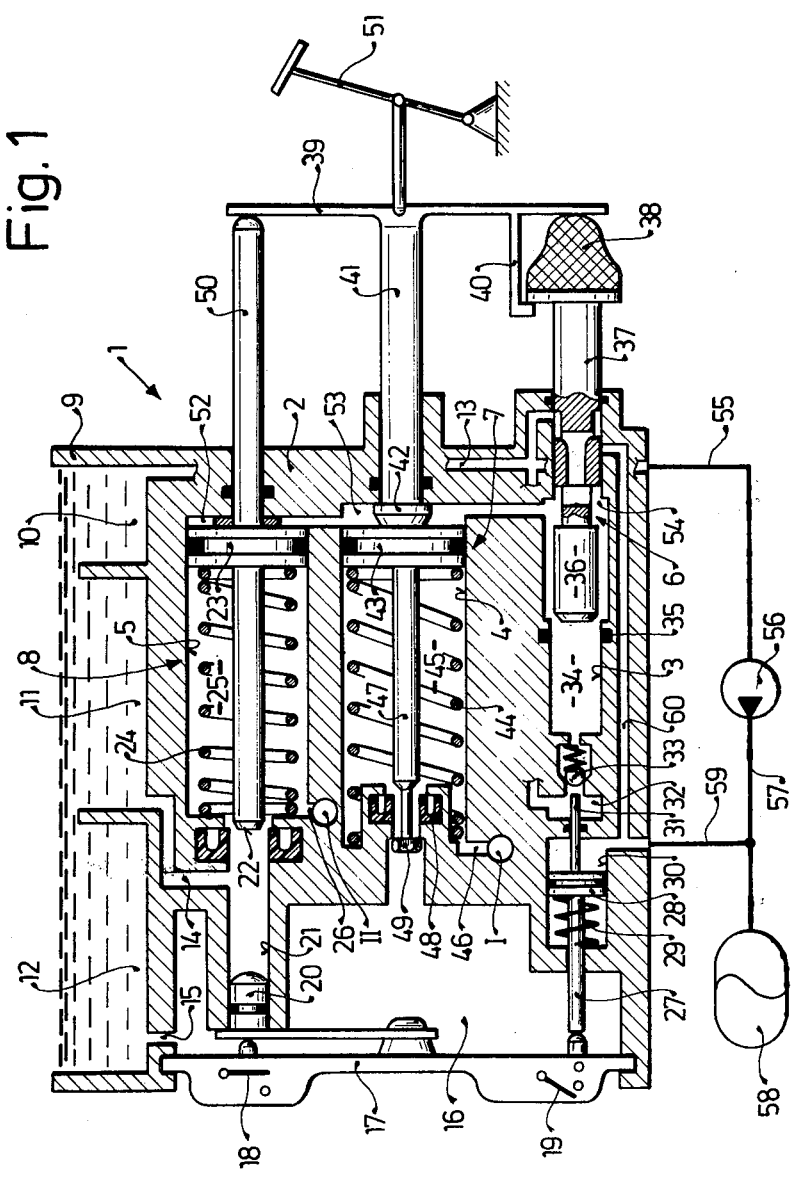

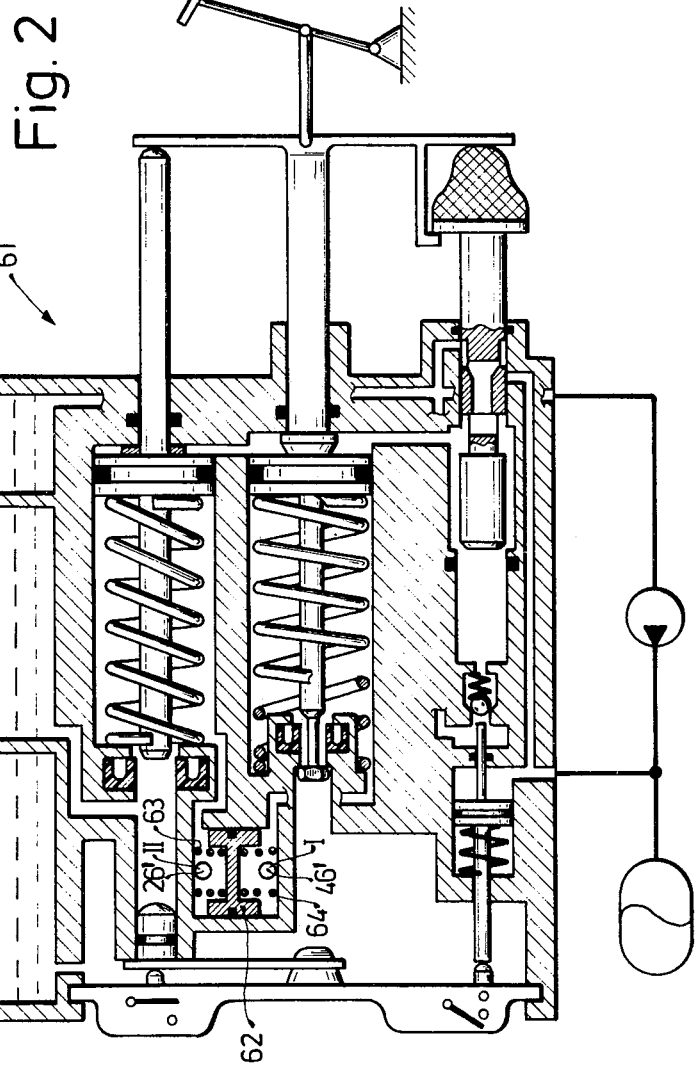

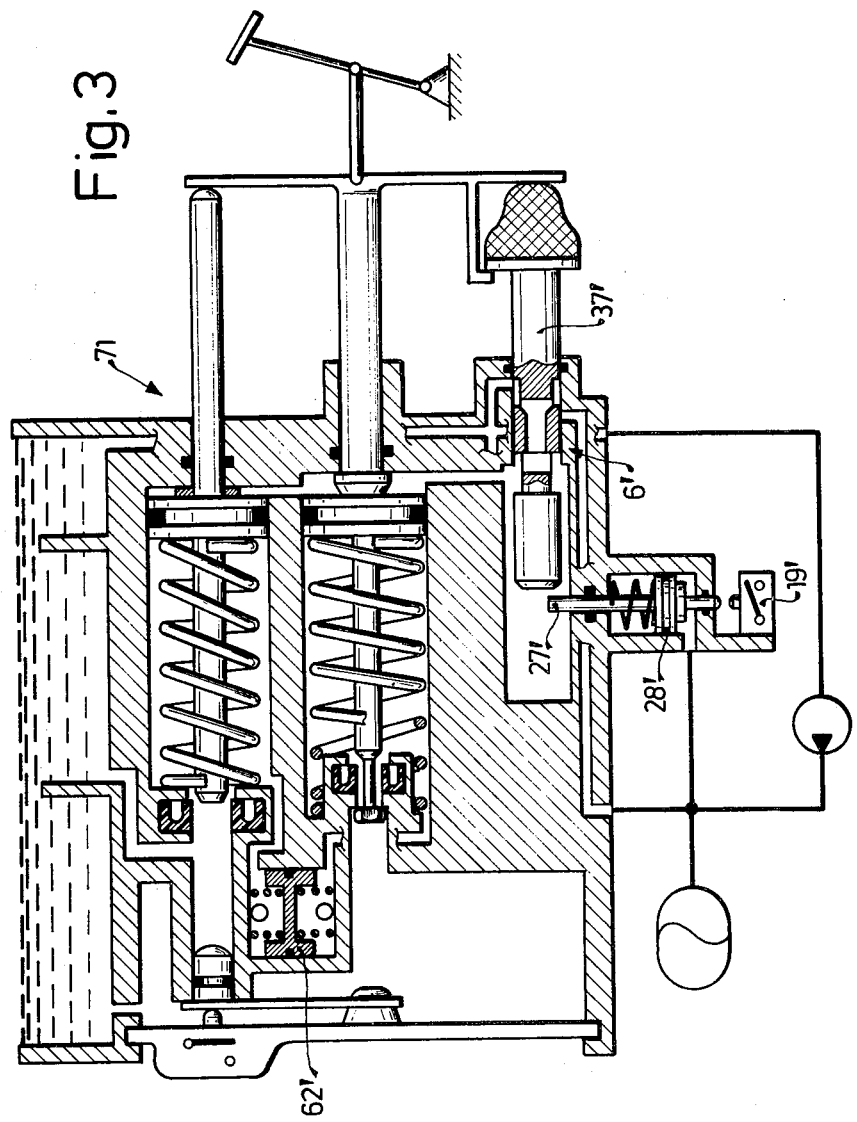

HYDRAULIC BRAKE BOOSTER

BACKGROUND OF THE INVENTION

The invention relates to a hydraulic brake booster for a vehicle brake apparatus having a pressurizing apparatus with a pump and a pressurized reservoir and further including a reservoir switchover piston adapted to be subjected to the reservoir pressure and engageable with a control valve. In such a structure, the control valve is in proximity to a booster cylinder and arranged to control both a connection of the pressurizing apparatus with the booster cylinder and a connection of the booster cylinder with a relief means. A brake booster apparatus such as denoted above is already well known.

In such brake boosters, the problem arises that when the supply of pressure medium is intact, only a small engaging stroke at the control valve is required, which is solely in order to switch over the control valve. However, when the supply of pressure medium fails, certain expedients are necessary in order to uncouple the control valve from the booster piston, so that the mechanical drive of the pedal force which then must necessarily be transmitted through the booster piston and the main cylinder piston, respectively, can be accomplished.

OBJECT AND SUMMARY OF THE INVENTION

The hydraulic brake booster of the present invention has the advantage over the latter that the control valve performs only one stroke required for its switchover, when the pressure medium supply is intact; when this supply fails, however, an overstroke can be accomplished in a simple manner, which permits the mechanical drive of the pedal force to be transmitted onto the booster piston and the main cylinder piston, respectively.

Either a switchover means or a hydraulic cushion can be employed as the removable support stop of the control valve; this is a matter of choice.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 1 shows partially in elevation and partially in cross section a first embodiment of the hydraulic brake booster;

FIG. 2 shows a generally similar view of a further embodiment of the brake booster shown in FIG. 1; and FIG. 3 shows another generally similar view of a further improvement in a stop means.

DESCRIPTION OF THE PREFERRED EMBODIMENTS

A hydraulic brake booster 1 has a housing 2, in which three parallel bores 3, 4, 5, which are recessed at several points, are provided for a control valve 6, a booster 7, and a main brake cylinder 8. Seated on the main brake cylinder 8 is a refill container 9 which has three chambers 10, 11 and 12. The liquid in chamber 10 is fed to the control valve 6 via a channel 13; the same liquid in chamber 11 communicates with the main brake cylinder 8 via a channel 14; and that in chamber 12 communicates via a channel 15 with a fluid filled zone 16 located on the left side of the brake booster 1 as viewed in the drawing, into which zone 16 all three bores 3, 4, 5 are arranged to discharge and as also clearly shown a cover cap 17 forms a closure for the end wall.

The cap 17 bears two switches 18 and 19 which are actuatable by pressure. The first switch 18 is located at the level of the main brake cylinder 8 and the second switch 19 is located at the level of the control valve 6. Switch 18 is actuated by a piston 20, which forms the end wall of a cylinder bore 21 to which the channel 14 is connected and into which an end portion 22 of a hydraulic main cylinder piston 23 can slidably extend in a sealed manner, as shown. A return spring 24 for the piston 23 is arranged in an enlarged bore which will be denoted a "spring chamber 25" and this chamber in turn is connected to a brake circuit II via an outlet 26.

The switch 19 is actuated by the terminal end of a piston rod 27, which is connected with a reservoir-switchover piston 28. The switchover piston 28 is arranged coaxially relative to the control valve 6 in the bore 3 and is movable under reservoir pressure against the force of a spring 29. A reservoir pressure cylinder is indicated by reference numeral 30. The piston 28 has an elongated stem 31, which projects into a relief chamber 32, which can be connected on one side to the channel 13 and on the other side to a support cylinder 34 via a valve 33 which valve the stem 31 can push open.

The support cylinder 34 is also arranged coaxially relative to the control valve 6 and has a ring-type sealing means 35 arranged in an annular recess in the cylinder wall 3, into which sealing means a support piston 36 is arranged to slide. This support piston 36 is integrally connected with a slidable shaft 37 provided on the control valve 6, the other end of which projects out of the housing 2 and carries a travel-limiting spring 38.

The travel limiting spring is stretched between the one end of a crossbar 39 and a coupler element 40 that is affixed on the crossbar.

The crossbar is arranged to support at its center a rod 41 which projects into the booster chamber 7. The rod 41 is generally in contact by means of its snub-nosed end 42 with a booster piston 43, which is movable in the booster chamber 7 against the force of a spring 44 positioned in chamber 45. The spring chamber 45 is connected with a brake circuit I via an outlet 46 and is adapted to be penetrated by a piston rod 47, which can extend through an annular sealing means 48, with the headed end of the rod 49 being guided as shown.

The other end of the crossbar 39, as shown, opposes a rod extension 50 of the main cylinder piston 23. The center of the crossbar 39 is provided with a link that is to be actuated by a pedal 51. Behind pistons 23 and 43 there are chambers 52 and 53, which in addition to being in communication with each other are also joined to a pressure exchange chamber 54 of the control valve 6.

An induction line 55 is connected to the channel 13 which communicates with the refill container chamber 10 and this induction line 55, as shown, also leads to a pump 56. A pressure line 57 exits this pump 56 and extends to a reservoir (accumulator) 58 and via a branch 59 into the reservoir pressure cylinder 30. The pump 56 and the reservoir 58 comprise a pressurizing apparatus 56/58 of the brake booster 1. The pressure line branch 59 is connected with the control valve 6 via a longitudinal channel 60.

Mode of Operation

When the pedal 51 is activated, the main cylinder piston 23, the booster piston 43, and the push rod 37 move toward the left as viewed in the drawing, until the control valve 6 has switched over. The pressure medium is directed into the chambers 52 and 53 by the pressurizing apparatus 56/58 and the two pistons 23 and 43 move farther to the left. Accordingly, these elements are released from the connection with the crossbar 39 and move ahead of the activation of the pedal 51. Both brake circuits I and II are supplied with pressure medium via the outlets 26 and 46. Braking occurs.

The push rod 37 slides in a sealed manner with its support piston 36 into the support cylinder 34 and is thereby arrested in its motion by the virtually incompressible medium. In a further motion of the pedal then the travel-limiting spring 38 is compressed, and the driver is thereby given a sense of the effective braking force. The switch 18 measures the brake pressure, and the switch 19 detects the reservoir (accumulator) pressure.

If the reservoir pressure falls below a predetermined level, then the connection between the crossbar 39 and the two pistons 23 and 43 must be maintained; that is, the means capable of controlling the push rod 37 must be disengaged.

This is accomplished by means of the movement of the switchover piston 28 to the right in response to the force of the spring 29, so that its stem 31 pushes the valve 33 open. This breaks the seal of the support cylinder 34 and thus removes its motion-arresting capability and, as a consequence, its contents flow back toward the refill container 9. The result is that the push rod 37 can move farther into the housing 2, so that pistons 23 and 43 of the brake cylinder and the booster can be mechanically actuated. Then the braking action is brought about without any boosting action being required.

FIG. 2 shows a hydraulic brake booster 61, which is embodied to a great extent very much like the booster shown in FIG. 1. However, here there is a pressure compensating piston 62 arranged between the two brake circuits I and II, which piston is acted upon by two springs 63 and 64. In this embodiment discharge openings 26' and 46' extending to the two brake circuits I and II are correlated with the two sides of the pressure compensating piston 62. In this way, pressure fluctuations between the two brake circuits I and II are equalized.

FIG. 3 is generally based on the structure of FIG. 2, but shows a different design for a stop for the control valve. Here a brake booster 71 has a reservoir switchover piston 28', which is disposed perpendicular to the shaft of a control valve 6' and is arranged so that it can move a piston rod 27' into the path of travel of a push rod 37' or can be moved outward away therefrom as shown. Thus, as can be readily appreciated from FIG. 3, the piston rod 27' serves here as a direct stop for the control valve 6'. A switch 19' which is generally similar to the switch 19 shown in the earlier views is also arranged differently in this embodiment.

Except for the direct support for the control valve 6', the mode of operation of this brake booster is the same as that of FIGS. 1 and 2 and need not be described further.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A hydraulic brake booster for a vehicle brake apparatus having a pressurizing apparatus with a pump and a pressurized reservoir and further including a reservoir switchover piston adapted to be subjected to the reservoir pressure and a control valve, said control valve being in proximity to a booster cylinder and arranged to control both a connection of the pressurizing apparatus with said booster cylinder and a connection of said booster cylinder with a relief means, further wherein said control valve includes a push rod that is associated with a stop means which cooperates with said control valve and thereby limits the stroke of said push rod and is automatically disengageable therefrom when the pressure supply fails.

2. A hydraulic brake booster according to claim 1, further wherein said stop means includes a piston which is slidable in a fluid-filled cylinder, said cylinder arranged to communicate with said relief means via a check valve which is actuatable by said reservoir switchover piston.

3. A brake booster according to claim 2, further wherein said reservoir switchover piston, check valve and said control valve are arranged coaxially.

4. A brake booster according to claim 2, further wherein said control valve is a slidable member having a travel-limiting spring at one end and said piston at the other end thereof.

5. A brake booster according to claim 1, further wherein said brake apparatus includes a main cylinder which is in parallel relation with said booster cylinder and a cylinder with which said control valve cooperates.

6. A brake booster according to claim 5, further wherein all of said cylinders are covered by a closure plate which includes plural pressure switches.

7. A brake booster according to claim 6, further wherein one each of said plural pressure switches are arranged to cooperate with said switchover piston and said main cylinder.

8. A brake booster according to claim 5, further wherein said brake apparatus includes at least a 3-chamber refill container, one said chambers in communication with said control valve and a second of said chambers in communication with said main cylinder.

9. A brake booster according to claim 8, further wherein a third chamber feeds fluid to a zone in proximity to a closure plate.

10. A brake booster according to claim 1, further wherein said main cylinder includes a piston and said booster cylinder includes a piston, each of said pistons being connected to a brake pedal and said pistons move ahead of the pedal actuation when pressure is applied and a pressure supply is intact.

11. A brake booster according to claim 1, further wherein said brake apparatus includes dual braking circuits and a pressure compensating piston means therefor in communication with each of said braking circuits.

12. A brake booster according to claim 5, further wherein each said main cylinder and said booster cylinder, includes piston means, and each said piston means forms one wall of a chamber with each of said chambers in communication.

13. A brake booster according to claim 12, further wherein said chambers are in communication with a pressure exchange chamber through which said control valve travels.

* * * * *